(12) United States Patent
Ujvari

(10) Patent No.: US 6,454,247 B2
(45) Date of Patent: Sep. 24, 2002

(54) ANTI-BACKDRAFT SHUTTER ASSEMBLY FOR AN AXIAL FLOW FAN

(75) Inventor: Gabor Ujvari, Salisbury (AU)

(73) Assignee: FF Seeley Nominees Pty Ltd (AT)

( * ) Notice: Subject to any disclaimer, the term of this patent is extended or adjusted under 35 U.S.C. 154(b) by 0 days.

(21) Appl. No.: 09/732,062

(22) Filed: Dec. 7, 2000

(30) Foreign Application Priority Data

Dec. 13, 1999 (AU) .............................................. PQ 4584

(51) Int. Cl.[7] ................................................. B01F 3/04
(52) U.S. Cl. .............. 261/105; 261/64.3; 261/DIG. 43; 454/259; 454/904
(58) Field of Search .............................. 261/28, 29, 30, 261/64.1, 64.3, 103, 105, 106, DIG. 3, DIG. 43; 454/259, 337, 904

(56) References Cited

U.S. PATENT DOCUMENTS

| | | | | |
|---|---|---|---|---|
| 218,596 A | * | 8/1879 | Taber | 454/259 |
| 1,623,286 A | * | 4/1927 | Strahan | 454/259 |
| 2,502,736 A | * | 4/1950 | Marcoe | 454/259 |
| 3,590,858 A | * | 7/1971 | Martin | 454/259 |
| 3,960,464 A | | 6/1976 | Downing | |
| 3,965,926 A | | 6/1976 | Buckner | |
| 4,257,444 A | | 3/1981 | Ogle, Jr. et al. | |
| 4,257,451 A | | 3/1981 | Paton | |
| 4,385,552 A | | 5/1983 | Nabben | |
| 4,823,367 A | * | 4/1989 | Robbins | 454/259 |
| 5,567,114 A | | 10/1996 | Wallace | |
| 5,716,271 A | * | 2/1998 | Paidosh | 454/904 |
| 5,919,582 A | | 7/1999 | Pedicini et al. | |

\* cited by examiner

Primary Examiner—C. Scott Bushey
(74) Attorney, Agent, or Firm—Watts, Hoffman, Fisher & Helinke Co., L.P.A.

(57) ABSTRACT

An anti-draft shutter assembly for an axial flow fan fitted to a duct. The assembly includes at least one counterbalanced flap supported downstream of airflow from the fan when in operation, and at least one of the flaps being pivotally supported outside the perimeter of the duct. The flap is biased by a counterbalance weight toward a duct closing position to close the duct when the fan is not operating. In the preferred embodiment, at least one flap is held in the closed position by a magnetic catch on the flap.

12 Claims, 3 Drawing Sheets

ANTI-BACKDRAFT SHUTTER ASSEMBLY FOR AN AXIAL FLOW FAN

FIELD OF THE INVENTION

This invention relates to an anti-backdraft shutter assembly to prevent the backflow of air through an axial flow fan as may, for example, be fitted to an evaporative cooler fixed to the roof of a building.

DESCRIPTION OF THE PRIOR ART

Throughout this description and the claims which follow, unless the context requires otherwise, the word "comprise", or variations such as "comprises" or "comprising" will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

An evaporative cooler of a type designed for the cooling of an entire building, is generally mounted in a fixed location on the roof of the building. When operating, the evaporative cooler draws air from outside the building, cools the air by drawing it over wetted pads, and distributes cooled air throughout the building via a system of ductwork, or through a distribution plenum. However, when the evaporative cooler is turned off, there exists an almost free air passage back through the ductwork and through the evaporative cooler which will allow air within the building to flow to the outside. Any pressure difference between the inside of the building and the outside will allow a flow of air through this free air passage of the evaporative cooler, thus creating a draft within the building.

This action is particularly troublesome in winter when the evaporative cooler is generally not being used. When the air in the building is heated, warm air rises to the roof or ceiling due to convection. The warm air will flow out of the building through the evaporative cooler unless some means is installed for interrupting its flow.

Traditionally, evaporative coolers have been fitted with external covers to make them as close as practicable to airtight during the winter. While this method does stop the flow of warm air out of the building, it does have a number of disadvantages. The cover requires the owner or agent to climb onto the roof to install. The cover is generally not installed until the weather is consistently cold, leaving many days when warm air can escape from the building but the weather does not warrant fitting the cover. Once installed, the cover is difficult and inconvenient to remove should there be more warm weather. The cover is subjected to the elements of the weather and generally has a short service life.

These disadvantages can be overcome by fitting an automatically operated flap beneath the fan which flap operates such that it is automatically opened when the fan is turned on, and automatically closes when the fan is turned off. When closed, the flap provides an almost airtight seal. Such devices have been offered as features in evaporative coolers in recent years, and one such device is described in our existing Australian Patent No. 693860 and its U.S. counterpart U.S. Pat. No. 5,567,114. The mechanism in our existing Patent consists of a counterbalanced flap which covers the delivery opening of a centrifugal fan when in the closed position. When the fan is operating, the counterbalanced flap is pushed into the open position and held there by the air pressure applied by the fan. That device overcomes all of the deficiencies described above relating to an external cover, and does not disturb the flow of air from the fan. However, while that device can readily be installed on a centrifugal fan, it is not readily adaptable for use on an axial flow fan.

An axial flow fan is somewhat more difficult to seal automatically without installing the sealing mechanism and its support in the airflow, hence disturbing the flow of air from the fan. Many devices which provide automatic sealing have been described. Examples include U.S. Pat. No. 4,385,552 "Exhaust fan and anti-backdraft shutter assembly", U.S. Pat. No. 3,965,926 "Flapper valve with independent plate suspension", U.S. Pat. No. 4,257,444 "Insert check valve or the like", U.S. 4,257,451 "Check valve" and U.S. Pat. No. 3,960,464 "Improvements in and relating to fans". The devices described invariably support their operating mechanism in the airflow of the fan, and require a spring mechanism to return the flaps to the closed position. All of these mechanisms result in degradation of the airflow from the fan due to the disturbance of the flow provided by the support structure of the mechanism in the airstream immediately following the fan. The use of springs as the means of closure of the flaps results in the maximum resistance to opening of the flaps in the full open position, when the flap will have the maximum disturbance to the airflow unless completely removed from the air stream. Since complete removal from the airstream would require a separate mechanism, the use of springs for flap return invariably results in incomplete removal of the flaps from the airstream in the open position, and further degradation of the air delivery of the fan. This effect is exacerbated if the fan is run at less than its maximum speed.

The present invention overcomes all of the disadvantages of the devices in the prior art. A flap support mechanism is out of the airstream. At least one flap is provided to close off a duct downstream of the fan. The at least one flap being counterbalanced by a lever and a counterweight to remain in the open position when a minimum of airflow is provided by the fan. When the fan is turned off, the unbalanced counterweight forces cause the flap to proceed towards the closed position, with the counterweight out of balance force increasing towards the closed position due to a change in lever arm of the counterweight. In the fully closed position, the holding force of the counterweight is preferably supplemented by a magnetic catch to ensure the flap is not blown open by wind external to the evaporative cooler. Once opened by operation of the fan, the flap remains in the full open position with virtually no disturbance to the air flow, even when the fan is run at part speed.

SUMMARY OF THE INVENTION

An anti-draft shutter assembly for an axial flow fan fitted to a duct, said assembly comprising at least one counterbalanced flap supported downstream of airflow from the fan when in operation, said at least one flap being pivotally supported outside the perimeter of the duct, when in situ, and being biased by a counterbalance weight toward a duct closing position to close the duct when the fan is not operating. Preferably, the at least one flap is held in the closed position by a magnetic catch on the at least one flap.

DESCRIPTION OF THE DRAWINGS

This invention will now be described by way of example with reference to the accompanying drawings which show a schematic of one embodiment of the present invention. In the drawings.

FIG. 1 illustrates the usual assembly of components of an axial fan evaporative cooler. The cooler is assembled onto a base 1, which also serves as a tank for storing water. A venturi 15 is mounted onto the base 1 and supports a motor 5 which in turn supports a fan 10. Comer support posts 3 provide support to a lid 2. Evaporative pads fitted to padframes 4 are then fitted between the base 1 and lid 2. Not illustrated is a pump for transferring water from the tank incorporated in the base 1 to the evaporative pads incorporated into padframes 4.

Figure 1:
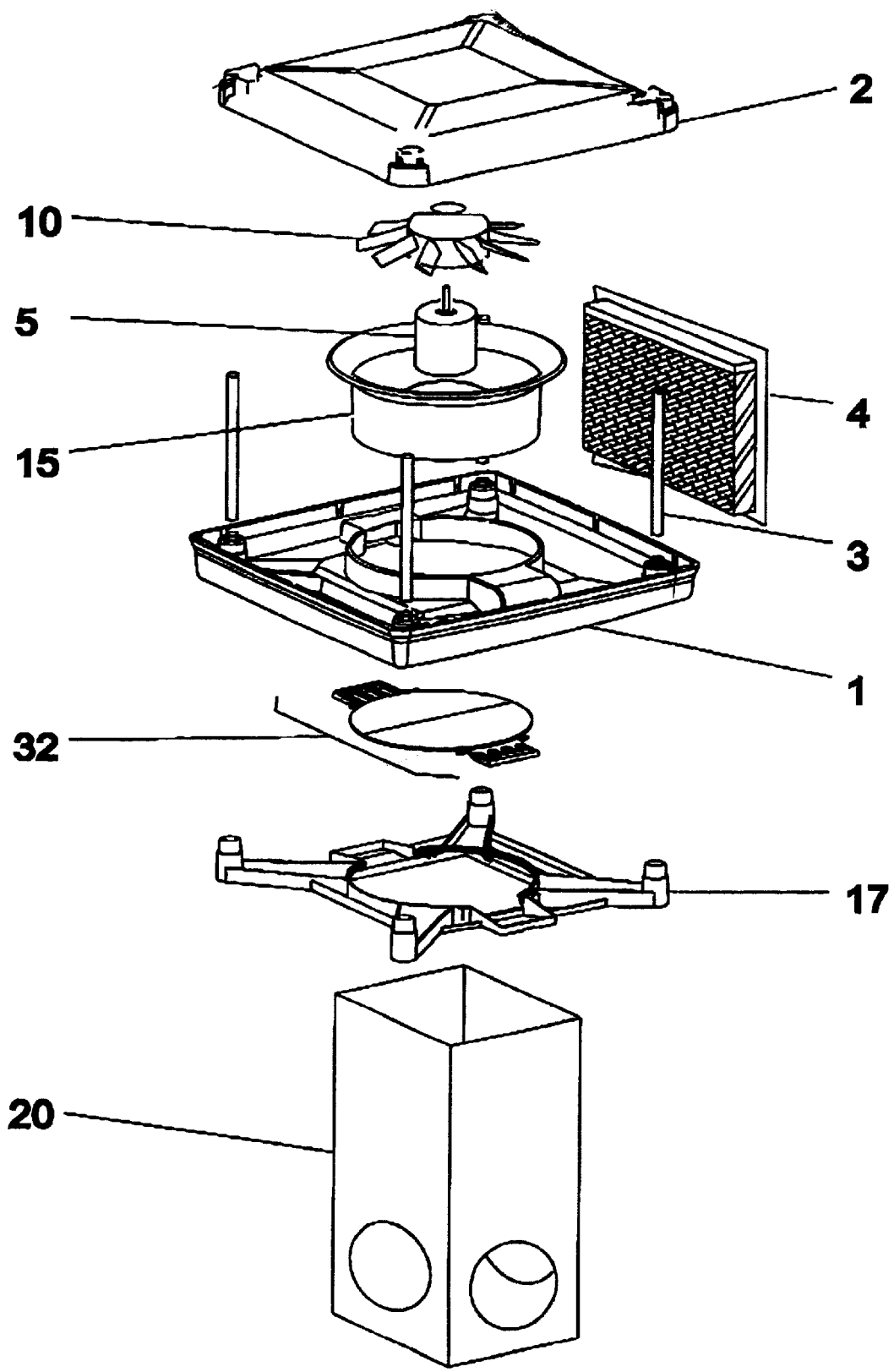
FIG. 1 shows an exploded view of a cooler with an anti-draft shutter assembly in accord with this embodiment exploded away from a transition piece between the fan and ductwork.

The cooler assembled as described above is mounted on a transition piece 17 which provides the transition in the shape of the air flow passage from circular at the fan to square in a delivery duct 20. An anti-draft shutter assembly 32 is positioned between the fan 10 and the delivery duct 20, and supported on the transition piece 17. The fan 10 is mounted in the venturi 15, with the anti-draft shutter assembly 32 immediately below the venturi 15 on the delivery side of the fan 10. The mounting position of the anti-draft shutter assembly 32 is such that the full air pressure of the fan is developed on the flaps 25 of the anti-draft shutter assembly 32 when the fan 10 is started with the flaps 25 in the closed position.

Figure 3:
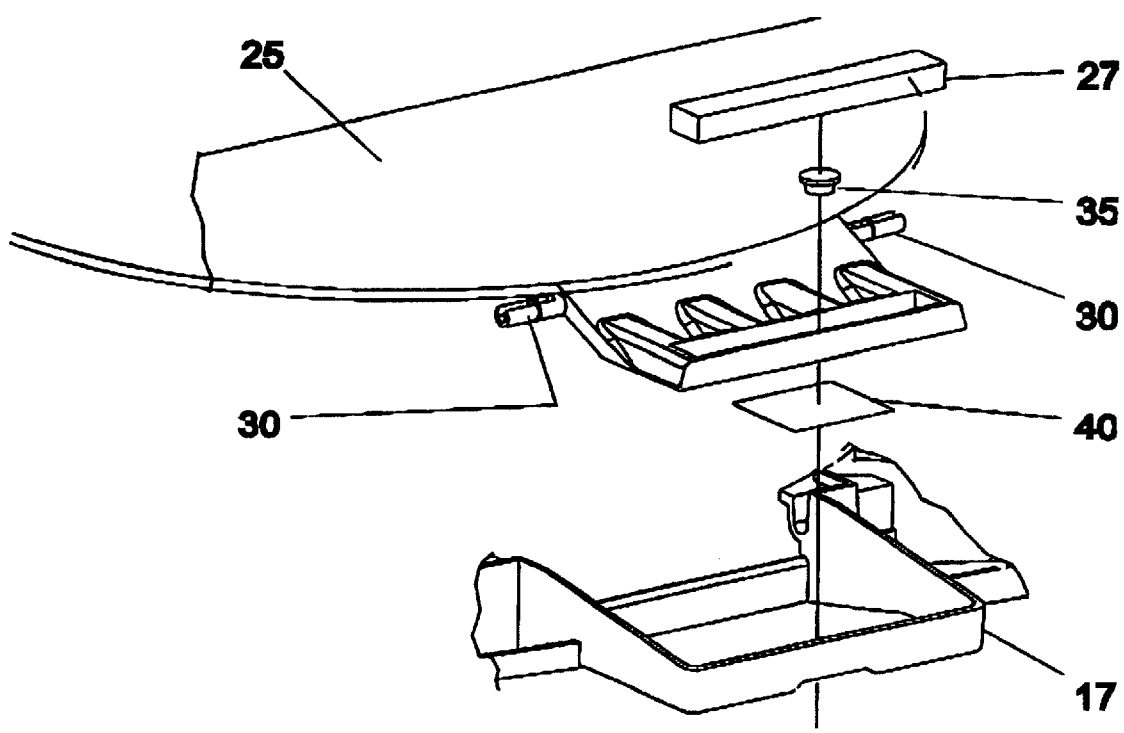
FIG. 3 illustrates the operation of a magnetic latch included as a preferred feature.

When the fan 10 is started, the air pressure developed on the flaps 25 causes a force on the flaps in the direction of opening of the flaps. When this force is sufficient to overcome the combination of the leveraged force between a magnet 35 and a magnet keeper 40, FIG. 3, and the resultant leveraged force of the weight of the flap 25 and counterweight 27, then the flaps will move towards the open position, rotating on pivots 30 which turn within their support formed as part of transition piece 17. The leveraged force between the magnet 35 and the magnet keeper 40 quickly drops to zero as soon as the magnet 35 moves away form the keeper 40, leaving only the resultant leveraged force of the weight of the flap 25 and counterweight 27 to restrain the flaps. This resultant leveraged force is relatively small, and reduces still further as the flaps move towards a vertical alignment. At the vertical (open) position, the resultant leveraged force-tending to close the flaps is very small, thus requiring a low air pressure from the fan airstream to keep the flaps in an open position. In the open position, the flaps are positioned as close as possible to the walls of the duct 20 resulting in very little disturbance of the airstream. The design of the pair of symmetrical flaps is such that the pivots 30 of the flaps 25 are located outside of the airstream and present no interference at all to the flow of air. Rotation of the flap pivots in the formation of transition piece 17 allows the flaps to pivot without the inclusion of additional parts in the mechanism.

When the fan 10 is turned off, the air pressure from the airstream rapidly reduces to zero.

With no pressure from airflow on the flaps, the only resultant leveraged force on the flaps is provided by the counterweight 27 and the weight of the flap 25. This resultant force is arranged such that the net effect is to tend to move the flap towards the closed position. As soon as the flap starts to move, the turning moment on the flap and counterweight tends to increase as the counterweight 27 moves further away from the vertical. This increase in turning moment ensures that the flap 25 will continue to move towards the closed position.

Figure 2:
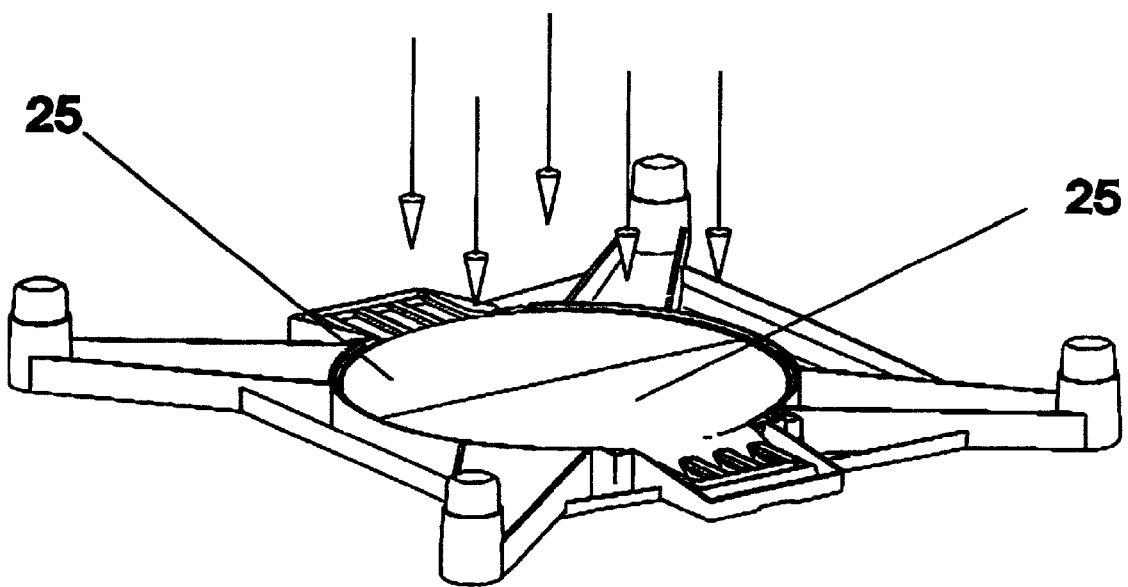
FIG. 2 illustrates the operation of the anti-draft assembly of this embodiment in its assembled position on the transition piece, with the remainder of the cooler removed for clarity.
Figure 2:
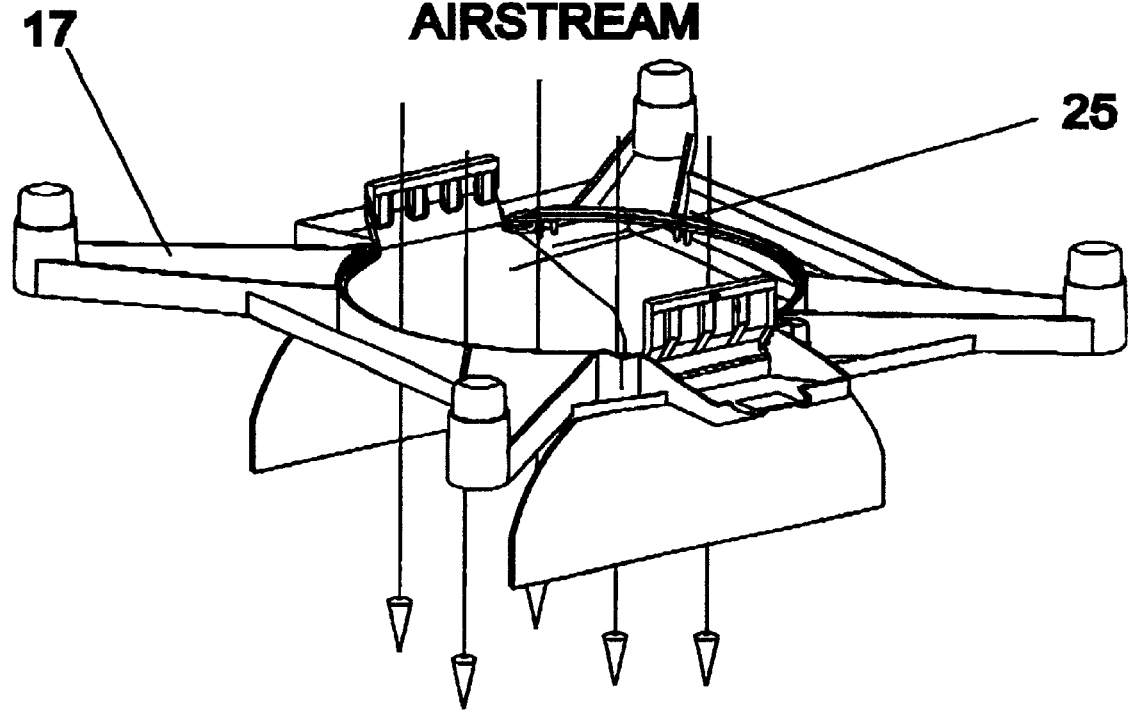

When each of the flaps 25 reaches the closed position, the magnet 35 is once again in close proximity to the keeper 40, resulting in a rapidly increasing force between the magnet 35 and keeper 40, thereby locking the flaps in the closed position, as shown in the upper rendition of FIG. 2 and providing sufficient resistance to re-opening that normal winds will not cause the flaps to open.

We claim:

1. An anti-draft shutter assembly for use in combination with an axial flow fan fitted to a duct, said assembly comprising at least one counterbalanced flap supportable downstream of airflow from the fan when in operation, said at least one flap when in situ being pivotally supported outside the perimeter of the duct, and being biased by a counterbalanced weight to a duct closing position to close the duct when the fan is not operating.

2. An assembly as claimed in claim 1, wherein there are two flaps.

3. An assembly as claimed in claim 2, wherein the flaps are pivotally mounted on a transition piece insertable between the axial fan and ducting of an evaporative air cooler.

4. An assembly as claimed in claim 3 wherein the flaps are retained in the duct closing position by magnetic force means.

5. An assembly as claimed in claim 1, wherein the at least one flap, when in situ, is pivotally mounted on a transition piece inserted between an axial flow fan and the duct.

6. An assembly as claimed in claim 1, wherein the at least one flap is retained in the duct closing position by magnetic force means.

7. An assembly as claimed in claim 2, wherein the flaps, when in situ, are mounted on a transition piece inserted between an axial flow fan and the duct.

8. As assembly as claimed in claim 2, wherein the flaps are retained in the duct closing position by magnetic force means.

9. In combination:
   a) an evaporative cooler including an axial flow fan and an outlet duct postioned along an air flow path from the fan;
   b) an anti-backdraft shutter interposed along the path between the fan and the duct; the shutters comprising:
      i) a pair of flaps pivotally mounted along the path, each flap being moveable about a respective pivot axis between closed positions aligned across the path and open positions on opposite side of the path; and,
      ii) the flaps each including a counter balancing portion urging the flaps toward the closed position.

10. The combination of claim 9 further including a pair of magnet and keeper sets respectively associated with the flaps for coaction with the counterbalances to maintain the flaps in the closed portions when the fan is not operating.

11. The combination of claim 9 further including a transition fitting including walls defining a through opening forming a part or the path and wherein the flaps are hingedly mounted on the fitting.

12. The combination of claim 9 wherein each flap includes a path blocking portion across the path when in the closed position and a counterweight carried by the counter balancing portion on a side of the same flap's pivot axis opposite the blocking portion.

* * * * *